June 6, 1950
D. L. LOTTS
2,510,749
VARIABLE SPEED TRANSMISSION
Filed May 6, 1948
3 Sheets-Sheet 1
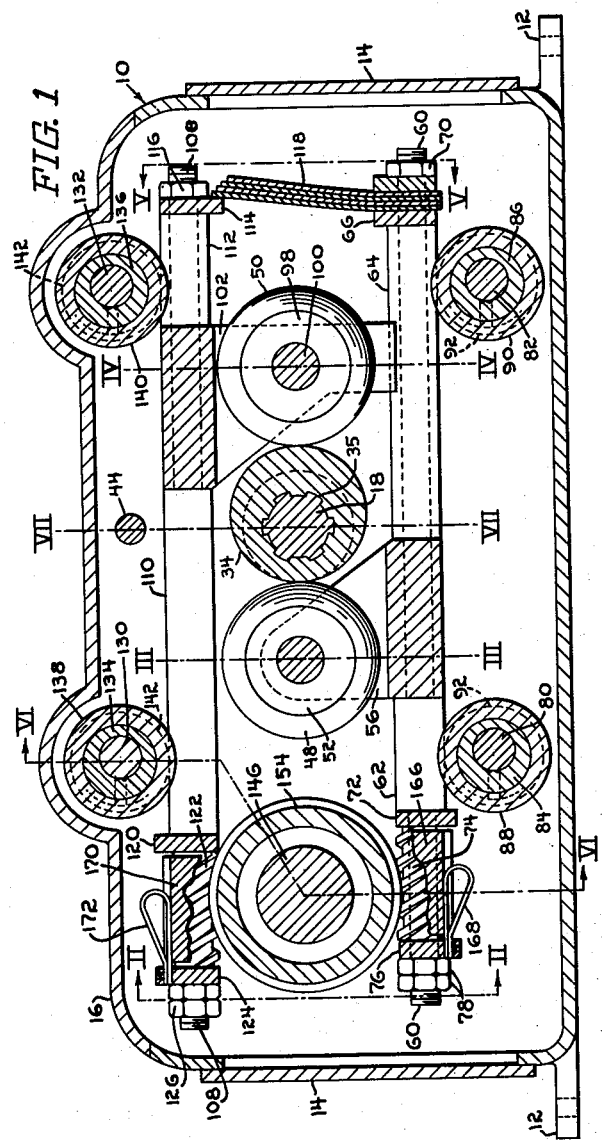
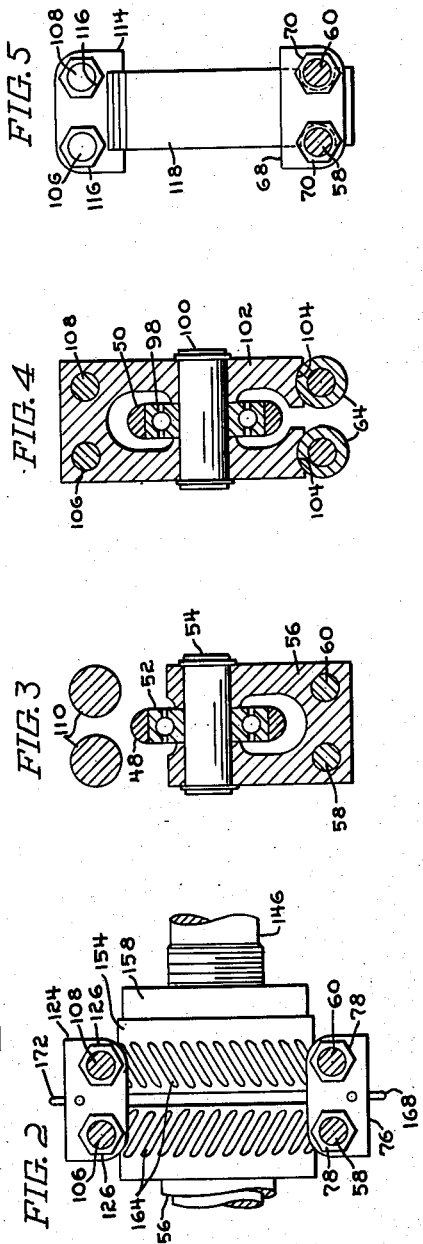
INVENTOR.
DELBERT L. LOTTS
BY
Oldham & Oldham
Attorneys

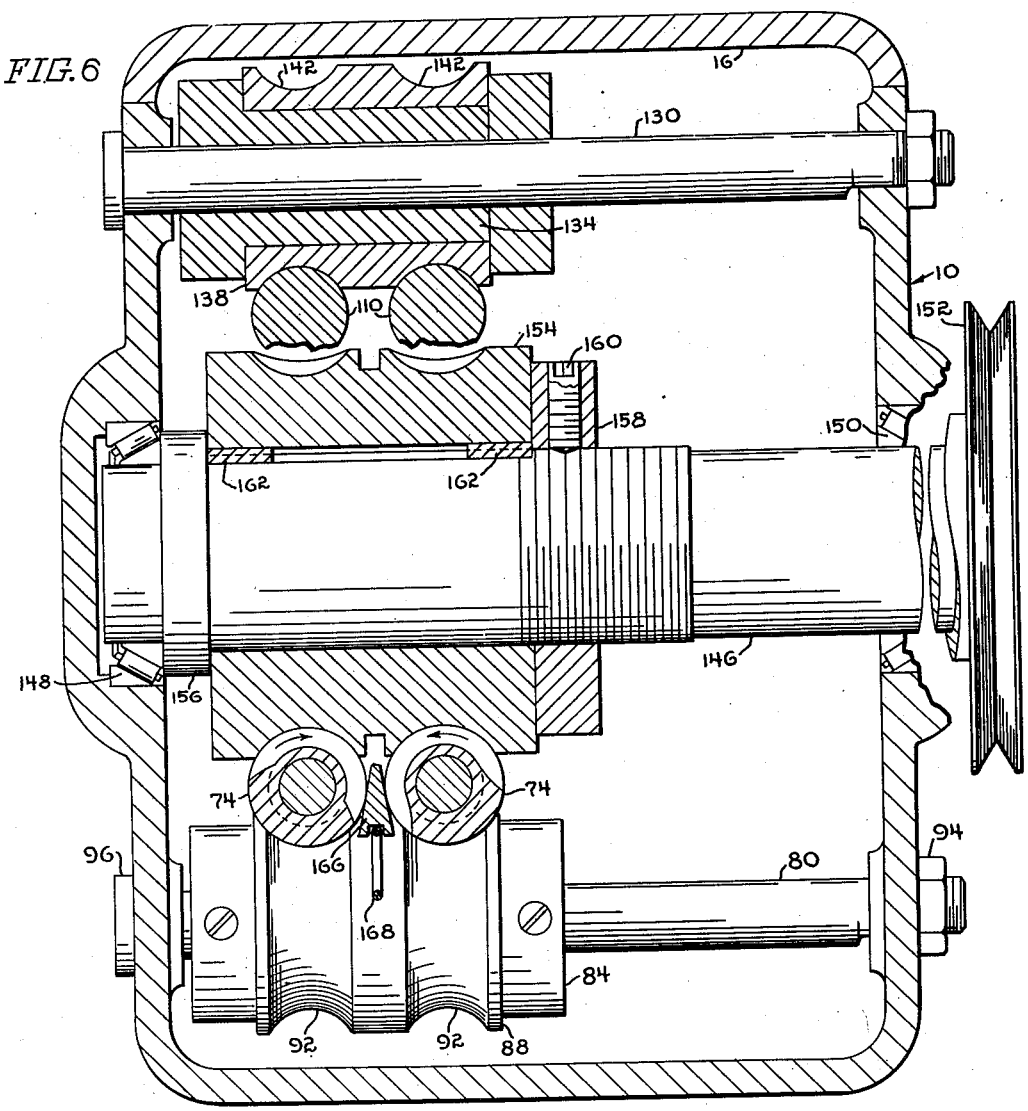

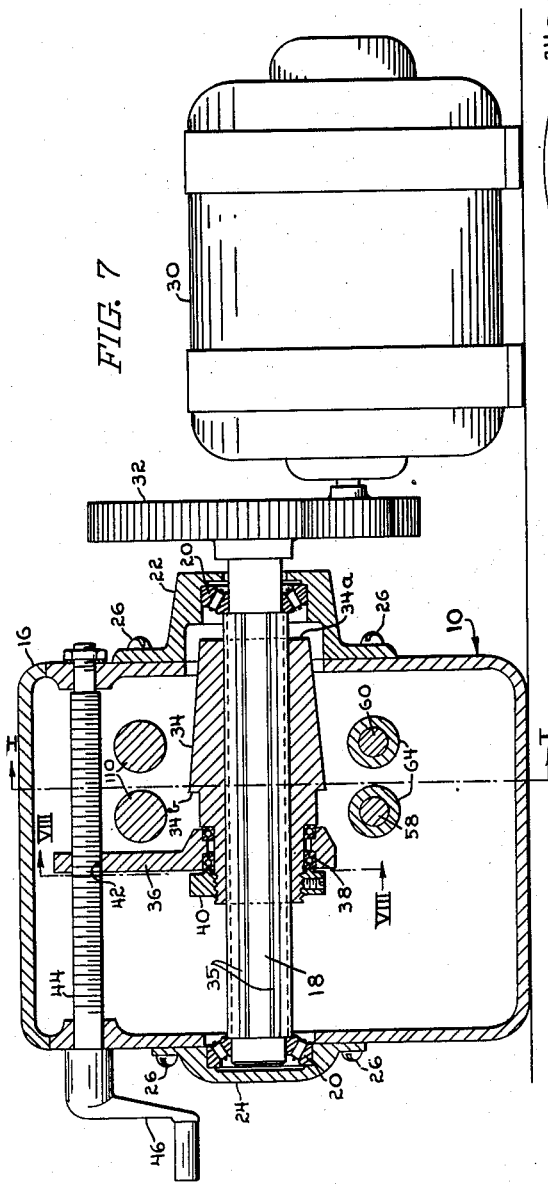

Patented June 6, 1950

2,510,749

UNITED STATES PATENT OFFICE 2,510,749

VARIABLE-SPEED TRANSMISSION

Delbert L. Lotts, Kent, Ohio

Application May 6, 1948, Serial No. 25,411

11 Claims. (Cl. 74—124)

This invention relates to speed reducers and variable speed transmissions, and, more particularly, is concerned with mechanisms of this type adapted to reduce driving shaft speeds substantially and throughout relatively wide limits.

Heretofore, various speed reducers and variable speed transmissions have been provided, but all known devices are open to one or more objections being, for example, relatively expensive initially, not providing the desired speed ratios or variance, wearing objectionably in use, having slippages present, or requiring high maintenance.

It is the general object of my invention to avoid and overcome the foregoing and other difficulties of and objections to known devices by the provision of a speed reducer and/or variable transmission which is relatively inexpensive initially, will effect desired speed changes between a driving and a driven shaft, which can be readily adjusted while in use to change speed ratios over wide limits, which is quiet and relatively light, and which will operate over long periods of time with substantially no maintenance or wear problems.

Another object of my invention is the provision of a speed reducer for greatly reducing speeds, and costing and weighing less than conventional reduction gearing.

Another object of my invention is to provide a variable speed transmission of compact size and comparatively low cost, but adapted to operate at high efficiencies over a wide range of speed, and which can be readily adjusted during the operation of the transmission.

The foregoing objects of my invention, and other objects which will become apparent as the description proceeds, are achieved by the provision of a variable transmission including a driving shaft, a driven shaft, a conical eccentric tapering to a substantially cylindrical portion, and driven by the driving shaft, followers engaging with substantially diametrically opposed portions of the eccentric, means for effecting relative axial movement between the eccentric and the followers to control the throw of the eccentric on the followers, and means for alternately transferring the linear movement of the followers to the driven shaft in the form of rotary movement. Preferably the last named means include a pair of opposite hand worm gears carried by the driven shaft, a pair of worms of opposite hand associated with and carried by each follower, and freely rotatable in one direction only, means locking the worms against rotation in the opposite direction, said worms engaging with the worm gears at substantially opposed portions thereof, and means resiliently holding the followers towards each other and against the eccentric.

If the variable speed transmission is to be utilized solely as a speed reducer of fixed ratio between the driving and driven shafts, then it is unnecessary to include means for effecting relative axial movement between the eccentric and the followers to control the throw of the eccentric on the followers.

For a better understanding of my invention, reference should be had to the accompanying drawings, wherein, Fig. 1 is a longitudinal, vertical, cross-sectional view through a typical apparatus incorporating the principles of my invention;

Fig. 2 is a transverse, vertical, cross-sectional view taken substantially on line II—II of Fig. 1, and illustrating details of the means for transferring the linear movement of the eccentric followers to rotary movement on the driven shaft;

Fig. 3 is a transverse, vertical, cross-sectional view taken substantially on line III—III of Fig. 1, and illustrating details of the mounting of one of the eccentric followers;

Fig. 4 is a transverse, vertical, cross-sectional view taken substantially on line IV—IV of Fig. 1, and illustrating details of the structure and mounting of the second follower for the eccentric;

Fig. 5 is a transverse, vertical, cross-sectional view taken substantially on line V—V of Fig. 1, and illustrating details of the resilient means for holding the cam followers towards the eccentric;

Fig. 6 is a transverse, substantially vertical, cross-sectional view taken substantially on line VI—VI of Fig. 1, and on an enlarged scale, and illustrating details of the driven shaft;

Fig. 7 is a transverse, vertical, cross-sectional view taken substantially on line VII—VII of Fig. 1, and illustrating details of the driving shaft, including means for changing the effective throw of the eccentric;

Fig. 8 is a vertical, cross-sectional view, taken substantially on line VIII—VIII of Fig. 7, and illustrating further details of the means for changing the effective throw of the eccentric; and Fig. 9 is an enlarged end view of the eccentric and its manner of construction, the driving shaft supporting the eccentric being shown in cross-section.

In the drawing, the numeral 10 indicates generally a casing, which obviously can be constructed in a number of ways, but which usually includes integrally formed holddown lugs 12, removable, gasketed end plates 14 and a removable cover 16.

Journaled in the casing, and transversely thereof, is a driving shaft, indicated as a whole by the numeral 18, this shaft being usually journaled by means of roller bearings 20 positioned in caps 22 and 24 removably secured to the casing by screws 26. Gasket means (not shown) may be associated with the bearing 20 in cap 22. The shaft 18 is adapted to be driven, as by motor 30, through a suitable drive, such as V-belts, or the like, although gearing 32 has been illustrated as connecting the motor 30 to the shaft 18.

Splined to the shaft 18 is a tapered or conical eccentric 34, the splines being indicated at 35, so that the eccentric will turn with the driving shaft 18, but is free to move axially thereof. The construction and operation of the eccentric 34 will be described in greater detail hereinafter. The eccentric 34 is adapted to be adjustably positioned at any desired point along the driving shaft 18, and to this end a yoke 36, best seen in Figs. 7 and 8, is rotatably mounted on bearings 38 for free rotary movement with respect to the eccentric, but with a nut 40 preventing relative axial movement between the yoke 36 and the eccentric 34. The upper end of the yoke 36 is provided with a tapped opening 42 into which is threaded a screw 44, which is journaled transversely of the casing, and with one end of the screw 44 having a crank 46 attached thereto, so that when the crank 46 is turned the screw 44 will move the yoke 36 and eccentric 34 axially of the driving shaft 18.

Associated with the eccentric 34, and positioned within the casing 10, are followers 48 and 50 which engage substantially diametrically opposed portions of the eccentric. As illustrated in Figs. 1 and 3, the follower 48 is mounted on a ball bearing 52 carried by a short shaft 54 received in a U-shaped bracket 56. The bracket 56 is carried on parallel rods 58 and 60 which have shoulder portions of increased diameter, and indicated by the numeral 62, against which the bracket 56 is adapted to be clamped by spacer tubes 64, end plates 66 and 68, which clamp the ends of the rod together, and nuts 70 screwed on the threaded ends of the rods 58 and 60 in the manner shown in Figs. 1 and 5. The left hand end of the rods 58 and 60, as seen in Figs. 1 and 2, have a bridging plate 72 which engages with the left hand end of the enlarged shoulder portions 62, each rod rotatably receiving a worm 74 of opposite hand, and end plate 76 holds the worms in position, the ends of the rods being threaded to receive locking nuts 78.

The structure just described, including the follower 48, bracket 56, rods 58 and 60, worms 74, and end and bridging plates, is rotatably supported for reciprocating movement. This is achieved by providing transverse shafts 80 and 82 in the bottom of the casing 10, each shaft having an eccentric hub 84 and 86 respectively secured to it, the hubs 84 and 86 rotatably carrying rings 88 and 90, the rings 88 and 90 being grooved at 92, as best seen in Fig. 6 to slidably receive the enlarged shoulder portions 62 of the rods 58 and 60, and the sleeve portions 64 carried by the rods. The shafts 80 and 82 are provided with locking nuts 94 at one end and a bolt head 96 at the other end to secure the shafts to the casing. Angular adjustment of the eccentric hubs 84 and 86 can be achieved either by turning the shafts 80 and 82 from outside the casing, or by turning the hubs (which may be fixed to the shafts by set screws) with respect to the fixed shafts. The angular adjustment of the eccentric hubs will raise or lower the plane of reciprocating movement of the rods 58 and 60, all as hereinafter more particularly described.

The follower 50 is mounted in a similar but reversed manner. More particularly, the follower 50 is carried on a ball bearing 98 secured to a shaft 100 carried by an inverted U-shaped bracket 102, the lower ends of the bracket 102 being grooved at 104 to slide on the upper surfaces of sleeves 64. The upper end of the bracket 102 is slidably received on rods 106 and 108, which have enlarged shoulder portions 110 against which the bracket is clamped by means of sleeves 112 and an end plate 114 held in position by nuts 116 received on the threaded ends of the rods 106 and 108. In conjunction with the end plate 114, it is to be noted that the end of a leaf spring 118 engages with the end plate, the leaf spring being clamped between the end plates 66 and 68 carried by the rods 58 and 60, with the leaf spring 118 functioning to resiliently urge the followers 48 and 50 towards each other and into engagement with the eccentric 34.

A bridging plate 120 abuts against the left hand end of the enlarged shoulder portions 110 of the rods 106 and 108, and the rods rotatably receive worms 122 of opposite hand, which are held in position on the rods by an end plate 124 and locking nuts 126 received on the threaded ends of the shafts 106 and 108.

The plane of reciprocating movement of the rods 106 and 108, and the structure carried thereby, is controlled by shafts 130 and 132 secured transversely of the casing 10, each shaft having an eccentric hub 134 and 136, respectively, secured thereto, the eccentric hubs rotatably carrying rings 138 and 140, each of the rings being formed with grooves 142 (see Fig. 6), which slidably engage with the enlarged shoulder portions 110, and with the sleeves 112 of the rods 106 and 108. The angular relation of the shafts 130 and 132 with respect to the casing can be controlled to effect the angular adjustment of the eccentric hubs 134 and 136, in the manner heretofore described in conjunction with shafts 80 and 82, or the position of the eccentric hubs 134 and 136 can be changed angularly with respect to fixed shafts, all to adjust the plane of reciprocation of the rods 106 and 108 and the mechanism carried thereby.

Positioned between the worms 122 and 74, and extending transversely of the casing 10, is a driven shaft 146, which as illustrated in Figs. 1, 2 and 6 is journaled at one end by a bearing 148 in the casing with the other end of the shaft extending out through the side of the casing through a bearing and packing means 150, and having a pulley or other driving means 152 associated therewith. Keyed to the driven shaft 146 is a double worm gear 154, and the worm gear may be axially positioned on the driven shaft 146, as by the provision of a shoulder 156 on the shaft, and a lock nut 158 held in place by a set screw 160 to hold the worm gear 154 tightly against the shoulder 156, locking keys between the gear and shaft being indicated by the numeral 162. The double worm gear 154, as best seen in Fig. 2, is formed with oppositely inclined worm gear teeth 164, with which the opposite hand worm gears 74 engage at the bottom of the gear, and the opposite hand worms 122 engage at the top of the worm gear 154.

Associated with the worms 74, and with the worms 122 are means which permit the free rotation of the worms in one direction, but which lock to prevent the rotation of the worms in the opposite direction. More particularly, and having reference to Figs. 1 and 6, a wedge 166 is positioned resiliently between the worms 74, this wedge having its wedging surfaces at an inclusive angle of between approximately seven degrees and fourteen degrees, and being resiliently held by a loop of spring wire 168 carried by the end plate 76. The spring 168 lightly urges the wedge 166 into position between the worms 74, and does not interfere with the worms 74 turning in the direction shown by the arrows in Fig. 6, but when the worms 74 attempt to turn in the opposite direction, the wedge 166 locks between the worms and prevents their rotation. In a like manner, wedge 170 is resiliently held by looped wire spring 172 down between the worms 122, the spring loop 172 being supported on the end plate 124.

A brief description of the operation of the apparatus as described heretofore is in order. Assuming the motor 30 is operating to drive the driving shaft 18, the rotation of this shaft will rotate the eccentric cone 34. With the parts in the position shown in Fig. 1 of the drawings, as the eccentric cone 34 turns, it will move the follower 48 positively to the left a distance equal to the throw of the eccentric cone. During the movement of the follower to the left, the wedge 166 will lock between the worms 74 inasmuch as the tendency of the worms is to rotate in the direction opposite to the arrows shown in Fig. 6. Inasmuch as the worms 74 cannot turn, they will act as a rack to drive the worm gear 154 and thus the driven shaft 146 through an arc proportional to the throw of the eccentric cone 34. As the high part of the eccentric cone passes the follower 48, the follower will begin to move to the right under the influence of the leaf spring 118, and at this time, the worms 74 rotate freely in the opposite direction, or in the direction shown by the arrows in Fig. 6. The wedge 166 does not interfere with this rotation of the worms, and the worms 74, rods 58 and 60 supporting them, and the whole assembly supporting the follower 48 moves to the right back to the position shown in Fig. 1, the worms 74 turning freely on the rods 58 and 60 to permit this action. If the follower 48 and its associated mechanism alone were utilized in the transmission, a continuous rotary movement imparted to the driving shaft 18 would result in stepped forward movement of the driven shaft 146 interspersed with a short dwell between each stepped forward movement, the period of dwell being substantially equal to the period of forward movement.

In order to impart continuous rotary motion to the driven shaft 146, the second follower 50 and its associated mechanism is utilized and performs in exactly the same manner, but in the periods of dwell of the mechanism associated with the follower 48. Specifically, and having reference to Fig. 1, as the follower 50 moves to the left during the start of the rotation of the eccentric cone 34 from the position shown in Fig. 1, the worms 122 revolve freely on the rods 106 and 108 and turn freely with the worm gear 154, the follower 50 following the eccentric cone 34 under the action of the leaf spring 118. However, after the eccentric cone 34 has been moved through one hundred eighty degrees, and is ready to move the follower 50 to the right, then the wedge 170 locks between the worms 122, to prevent their rotation, and during the movement to the right of the follower 50 the worms 22 act as a rack to rotate the worm gear 154 and driven shaft 146 through an arc equal to the arc imparted by the follower 48 and worms 74. The result is a continuous rotation of the driven shaft 146 in direct response to the throw of the eccentric cone 34.

In order to change the speed ratio between the driving shaft 18 and the driven shaft 146, it is only necessary to operate the crank 46 to rotate screw 44 and move yoke 36 and the associated eccentric cone 34 lengthwise of the driving shaft 18 to increase or decrease the throw of the eccentric cone 34. Thus, relatively wide speed ratios can be obtained.

Having more particular reference now to Fig. 9 of the drawings which shows in greater detail the construction of the eccentric cone 34, it will be understood that Fig. 9 is an end elevation of the eccentric cone looking at the small end thereof. It will first be recognized that the small end of the eccentric cone, designated by the numeral 34$^a$, is substantially circular with no eccentric action whatsoever. The large end of the eccentric cone, designated by the numeral 34$^b$, can be made to have an eccentric throw of up to three quarters of an inch or more whereby speeds approaching a one to one drive between the driving and the driven shaft can be obtained, dependent upon the dimensions of the remaining parts of the apparatus, the pitch of the worms, and the like. However, the apparatus is more usually adapted to sizable speed reduction to a driven shaft and variance of the speed of the driven shaft. Of course, when the followers 48 and 50 are positioned in association with the substantially circular end 34$^a$ of the eccentric cone, there will be no rotation at all of the driven shaft 146.

Having further reference to Fig. 9 of the drawings, at the point A of the eccentric cone, this is parallel to the axis of the driving shaft the full length of the eccentric. From point A to point B there is a relatively quick rise in the eccentric to take up any lost motion in the apparatus. From point B to point C there is a constant rise in the eccentric per the angular displacement thereof. From point C to point D, the cam is contoured to keep in contact with the follower, and to keep the follower from jumping off of the eccentric during the change in direction of motion of the follower. From point D to point E there is a uniform angular descent, and from point E to point A there is a slower angular descent to bring the eccentric back to the starting point A. An eccentric designed in the manner described provides a relatively noiseless and satisfactorily quiet operation. Throughout the specification and claims the member 34 has been termed an eccentric. Actually it might better be described as a cam or a conical cam of the special shape and structure described. However, regardless of whether this member is called a cam or an eccentric, its shape and function will be understood from the foregoing description.

From the foregoing, it will be recognized that the various objects of my invention has been achieved by the provision of a speed reducer and/or variable speed transmission characterized by simplicity, inexpensiveness, long life, a wide variety of speed changes, compactness and light weight. The apparatus is adapted to function over long periods of time with substantially no attention or maintenance problems, it being understood that the casing 10 is provided with a lubricating oil to a depth desired. Adjustments can be made from the outside of the casing, both with respect to speed changes and wear take-up.

While in accord with the patent statutes one embodiment of my invention has been illustrated and described in detail, it is to be particularly understood that I am not to be limited thereto or thereby, but that the scope of my invention is defined in the appended claims.

I claim:

1. A variable speed transmission including a driving shaft, a driven shaft, a conical eccentric tapering to a substantially cylindrical portion and driven by the driving shaft, followers engaging with substantially diametrically opposed portions of the eccentric, means for effecting relative movement in an axial direction between the eccentric and the followers to control the throw of the eccentric on the followers, a pair of opposite hand worm gears carried by the driven shaft, a pair of worms of opposite hand associated with and carried by each follower and freely rotatable in one direction only, means locking the worms against rotation in the opposite direction, said worms engaging with the worm gears at substantially opposed portions thereof, and means resiliently holding the followers towards each other and against the eccentric.

2. A variable speed transmission including a driving shaft, a driven shaft, a conical eccentric tapering to substantially a cylindrical portion and driven by the driving shaft, followers engaging with substantially diametrically opposed portions of the eccentric, means for effecting relative movement in an axial direction between the eccentric and the followers to control the throw of the eccentric on the followers, a pair of opposite hand worm gears carried by the driven shaft, a pair of worms of opposite hand associated with and carried by each follower and freely rotatable in one direction only, means locking the worms against rotation in the opposite direction, said worms engaging with the worm gears at substantially opposed portions thereof, means resiliently holding the followers towards each other and against the eccentric, and means for adjusting the clearance between the worms and worm gear.

3. A variable speed transmission including a driving shaft, a driven shaft, a conical eccentric tapering to a substantially cylindrical portion and driven by the driving shaft, roller followers engaging with substantially diametrically opposed portions of the eccentric, means for effecting relative movement in an axial direction between the eccentric and the followers to control the throw of the eccentric on the followers, worm gear means carried by the driven shaft, worm means associated with and carried by each follower and freely rotatable in one direction only, wedge means locking the worm means against rotation in the opposite direction, said worm means engaging with the worm gear means at substantially opposed portions thereof, and means resiliently holding the followers towards each other and against the eccentric.

4. A transmission including a driving shaft, a driven shaft, an ecentric driven by the driving shaft, followers engaging with opposed portions of the eccentric, means for effecting relative movement in an axial direction between the eccentric and the followers to control the throw of the eccentric on the followers, a pair of opposite hand worm gears carried by the driven shaft, a pair of worms of opposite hand associated with and carried by each follower and freely rotatable in one direction only, means locking the worms against rotation in the opposite direction, said worms engaging with the worm gears at substantially opposed portions thereof, and means resiliently holding the followers towards each other and against the eccentric.

5. A transmission including a driving shaft, a driven shaft, an eccentric driven by the driving shaft, followers engaging with opposed portions of the eccentric, a pair of opposite hand worm gears carried by the driven shaft, a pair of worms of opposite hand associated with and carried by each follower and freely rotatable in one direction only, means locking the worms against rotation in the opposite direction, said worms engaging with the worm gears at substantially opposed portions thereof, and means resiliently holding the followers towards each other and against the eccentric.

6. A variable speed transmission including a driving shaft, a driven shaft, a conical eccentric driven by the driving shaft, followers engaging with opposed portions of the eccentric, multiple worm gear means carried by the driven shaft, multiple worm means associated with and carried by each follower and freely rotatable in one direction only, means locking the worm means against rotation in the opposite direction, said worm means engaging with the worm gear means at substantially opposed portions thereof, and means resiliently connecting the followers together and holding the followers towards each other and against the eccentric.

7. A speed changer including a driving shaft, a driven shaft, a conical eccentric driven by the driving shaft, a follower engaging with the eccentric, a pair of opposite hand worm gears carried by the driven shaft, a pair of opposite hand worms associated with and carried by the follower and engaging with the worm gears, said worms being freely rotatable in one direction, a wedge urged into position between the worms to prevent rotation of the worms in the opposite direction, and means for adjusting the eccentric axially of the follower.

8. A speed changer including a driving shaft, a driven shaft, an eccentric driven by the driving shaft, a follower engaging with the eccentric, a pair of opposite hand worm gears carried by the driven shaft, a pair of opposite hand worms associated with and carried by the follower and engaging with the worm gears, said worms being freely rotatable in one direction, and a wedge urged into position between the worms to prevent rotation of the worms in the opposite direction.

9. A variable speed transmission including a driving shaft, a driven shaft, a cone eccentric splined to the driving shaft, means for controlling the axial position of the eccentric on the driving shaft, a frame slidably supported for reciprocating movement on one side of the eccentric, a frame slidably supported for reciprocating movement on the opposite side of the eccentric, a follower mounted on each frame, resilient means connecting the frames and tending to hold the followers against opposite sides of the eccentric, means for separately adjusting the plane of reciprocating movement of each frame, a driven shaft positioned between the frames, and means for converting the reciprocating movement of the frames to rotary movement in the same direction to the driven shaft.

10. A variable speed transmission including a driving shaft, a driven shaft, a cone eccentric splined to the driving shaft, a frame slidably supported for reciprocating movement on one side of the eccentric, a frame slidably supported for reciprocating movement on the opposite side of the eccentric, a follower mounted on each frame, resilient means connecting the frames and tending to hold the followers against opposite sides of the eccentric, means for separately adjusting the plane of reciprocating movement of each frame, a driven shaft positioned between the frame, and means for converting the reciprocating movement of the frames to rotary movement in the same direction to the driven shaft.

11. A variable speed transmission including a driving shaft, a driven shaft, a cone eccentric splined to the driving shaft, a frame slidably supported for reciprocating movement on one side of the eccentric, a frame slidably supported for reciprocating movement on the opposite side of the eccentric, a follower mounted on each frame, resilient means connecting the frames and tending to hold the followers against opposite sides of the eccentric, a driven shaft positioned between the frames, and means for converting the reciprocating movement of the frames to rotary movement in the driven shaft.

DELBERT L. LOTTS.

REFERENCES CITED

The following references are of record in the file of this patent:

UNITED STATES PATENTS

| Number | Name | Date |
| --- | --- | --- |
| 1,812,460 | Wellton | June 30, 1931 |
| 1,954,767 | Foster | Apr. 10, 1934 |

FOREIGN PATENTS

| Number | Country | Date |
| --- | --- | --- |
| 23,978 | Denmark | Jan. 25, 1908 |